United States Patent [19]

Nishiyama

[11] Patent Number: 4,572,309
[45] Date of Patent: Feb. 25, 1986

[54] LOAD CELL TYPE WEIGHT-MEASURING DEVICE

[75] Inventor: Yoshihisa Nishiyama, Shizuoka, Japan

[73] Assignee: Tokyo Electric Co., Ltd., Tokyo, Japan

[21] Appl. No.: 668,263

[22] Filed: Nov. 5, 1984

[30] Foreign Application Priority Data

Nov. 15, 1983 [JP] Japan .................. 58-214409
Nov. 15, 1983 [JP] Japan .................. 58-214410

[51] Int. Cl.⁴ .............. G01G 19/52; G01G 23/14; G01G 3/14; G01L 1/22
[52] U.S. Cl. ..................... 177/50; 177/164; 177/211; 73/1 B; 73/862.67
[58] Field of Search ............. 177/50, 164, 165, 211; 73/1 B, 862.67

[56] References Cited

U.S. PATENT DOCUMENTS

| | | | |
|---|---|---|---|
| 4,061,198 | 12/1977 | Caldicott | 177/50 |
| 4,139,069 | 2/1979 | Domis et al. | 177/50 X |
| 4,294,322 | 10/1981 | Nishiyama | 177/164 X |
| 4,417,631 | 11/1983 | Jonnson | 177/165 X |

Primary Examiner—George H. Miller, Jr.
Attorney, Agent, or Firm—Frishauf, Holtz, Goodman & Woodward

[57] ABSTRACT

A load cell type weight-measuring device includes a load cell; a test voltage generator for generating a voltage equal to a rated output voltage of the load cell; a zero-point setting circuit; an amplifying circuit; a switching circuit for selectively coupling the load cell and test voltage generator to the amplifying circuit; and a data processing circuit for generating weight data corresponding to an output signal from the amplifying circuit. The amplifying circuit includes a first amplifier of a gain 1 for amplifying an output voltage from the zero-point setting circuit; first and second resistors; and a second amplifier whose first input terminal is connected to an output terminal of the first amplifier through the first resistor and is connected to its own output terminal through the second resistor and whose second input terminal is connected to the switching circuit.

11 Claims, 3 Drawing Figures

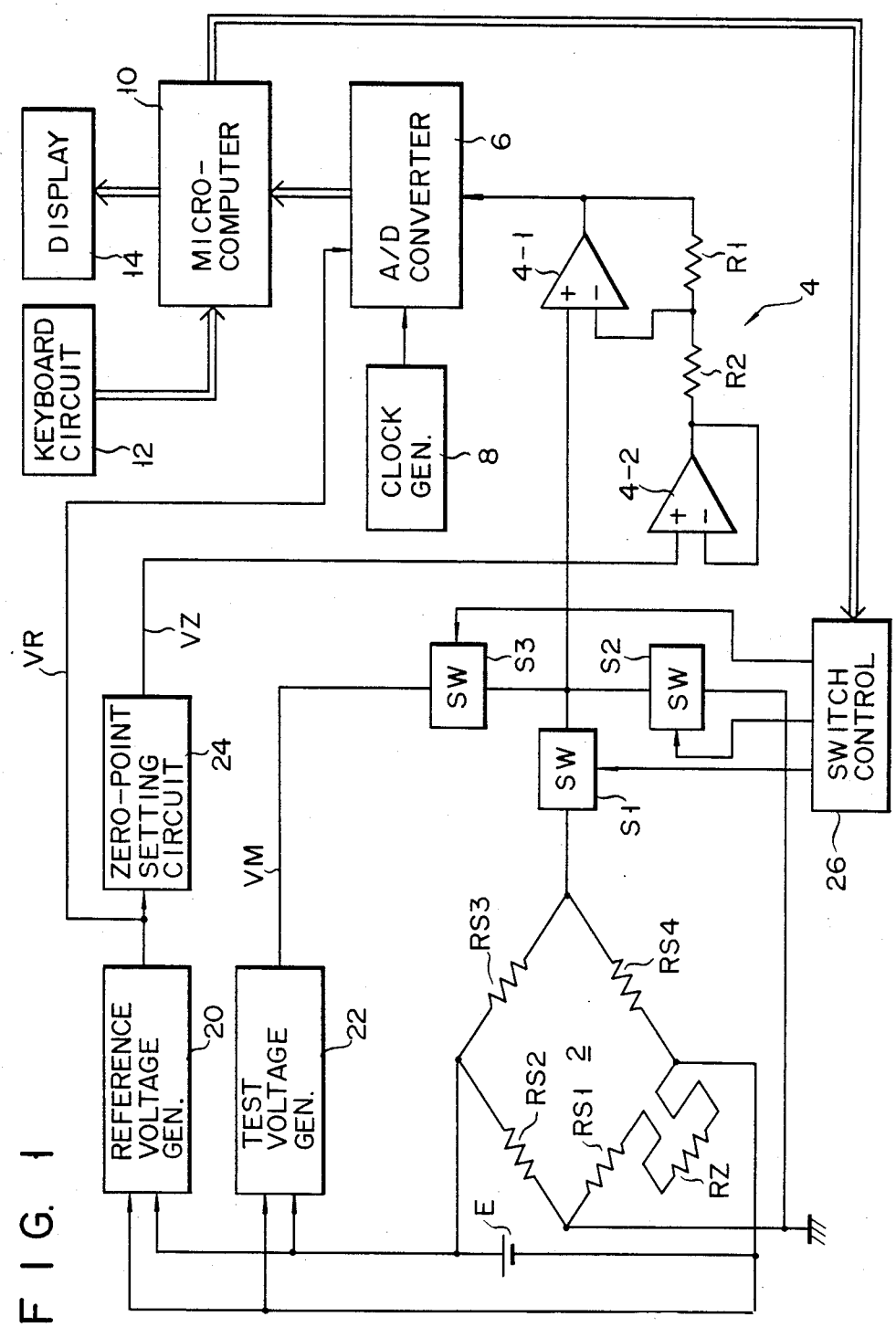
F I G. 1

F I G. 3
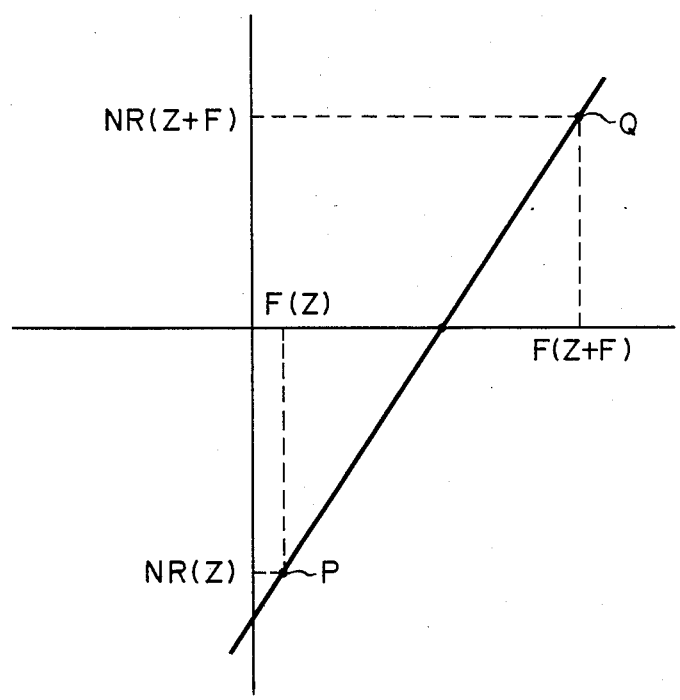

LOAD CELL TYPE WEIGHT-MEASURING DEVICE

BACKGROUND OF THE INVENTION

The present invention relates to a load cell type weight-measuring device.

Generally, a high degree of accuracy is required in the load cell type weight-measuring devices which are constituted so as to have various kinds of checking functions to check the operating state. For example, in West Germany, it is required that the load cell type weight-measuring device of this kind have double-checking functions. The double-checking functions denote that when the load cell type weight-measuring device is being used, the device is automatically checked to see if it is normally operating or not. In the case where the operation is abnormal, use of this device is discontinued. Conventionally, a load cell type weight-measuring device which can sufficiently effectively execute such a double-checking function has not yet been realized.

SUMMARY OF THE INVENTION

It is an object of the present invention to provide a load cell type weight-measuring device which can easily effect the double-checking functions.

This object is accomplished by a load cell type weight-measuring device comprising a load cell; a test voltage generating circuit for generating a voltage which is equal to a rated output voltage of this load cell; a zero-point setting circuit; a first amplifier of a gain 1 for amplifying an output voltage from this zero-point setting circuit; first and second resistors; a second amplifier whose first input terminal is coupled to an output terminal of the first amplifier through the first resistor and is coupled to its own output terminal through the second resistor; a switching circuit which selectively couples the load cel and test voltage generating circuit to a second input terminal of the second amplifier; and a data processing circuit which converts an output voltage from the second amplifier to digital data and generates weight data corresponding to this digital data.

In this invention, the output voltage of the zero-point setting circuit is supplied to the first input terminal of the second amplifier through the first amplifier of a gain 1. The output voltage of the test voltage generating circuit is supplied to the second input terminal of the second amplifier through the switching circuit. Therefore, the double-checking function can be easily effected by selectively supplying a load cell output voltage, test voltage and a reference voltage to the second amplifier.

BRIEF DESCRIPTION OF THE DRAWINGS

FIG. 1 is a circuit diagram of a load cell type weight-measuring device according to an embodiment of the present invention;

FIG. 3 is a graph showing the relationship between the weight which is applied to the load cell type weight-measuring device shown in FIGS. 1 and 2 and the digital output data therefrom.

DETAILED DESCRIPTION OF THE PREFERRED EMBODIMENT

Figure 2:
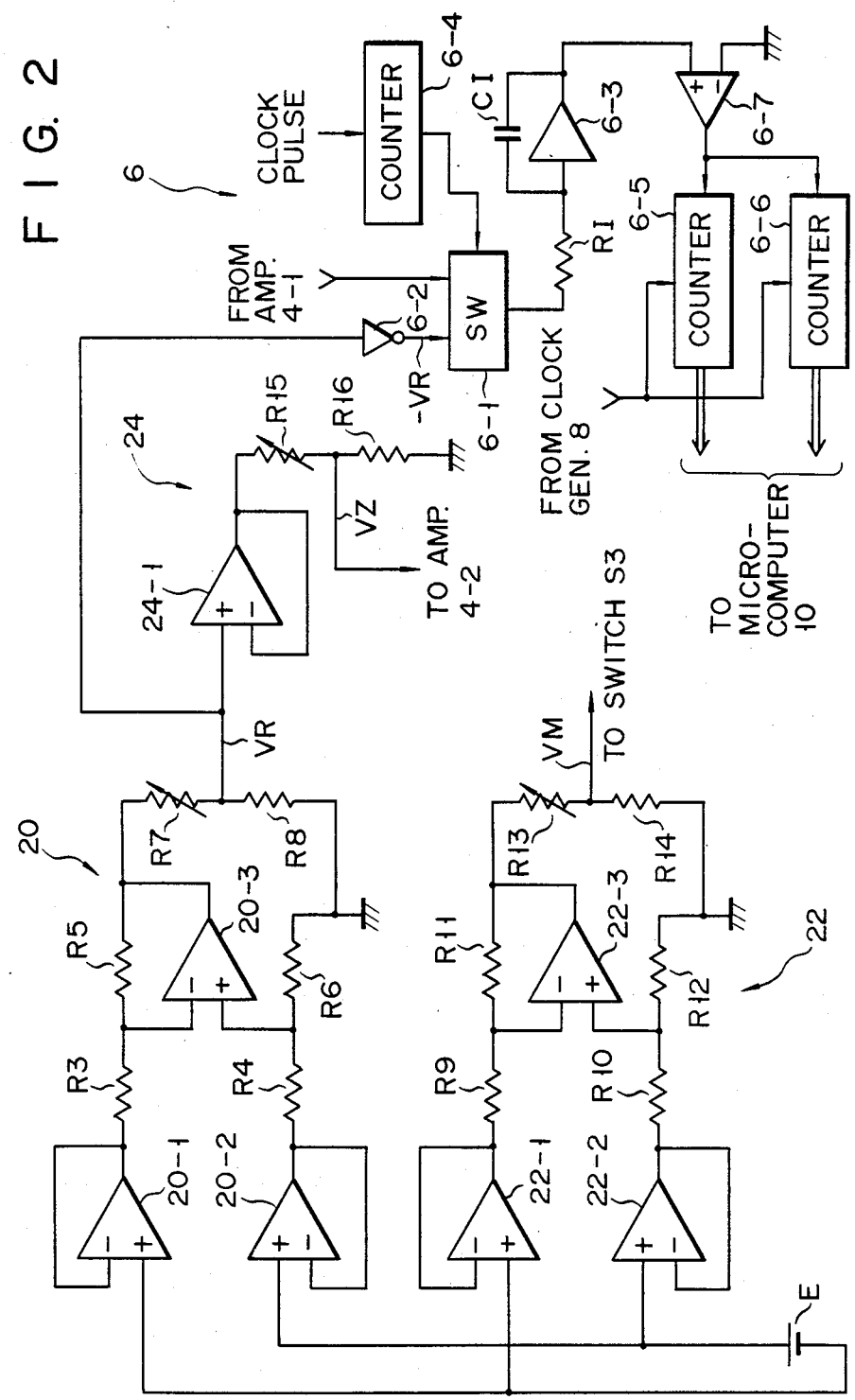
FIG. 2 is a detailed circuit diagram of the reference voltage generator, test voltage generator, zero-point setting circuit, and A/D converter shown in FIG. 1.

FIG. 1 shows a circuit diagram of a load cell type weight-measuring device according to one embodiment of the present invention. This load cell type weight-measuring device includes a load cell 2 which is constituted by four strain gauge resistors RS1 to RS4 connected like a bridge and a bridge balance correcting resistor RZ connected in series to the strain gauge resistor RS1; and a driving power source E which supplies a driving voltage VE to this load cell 2. An output signal of the load cell 2 is supplied to an amplifying circuit 4 through a switch S1. The amplifying circuit 4 includes amplifiers 4-1 and 4-2; and resistors R1 and R2 which are connected in series between output terminals of the amplifiers 4-1 and 4-2. An inverting input terminal of the amplifier 4-1 is connected to a junction between the resistors R1 and R2, while a non-inverting input terminal is connected to the output terminal of the load cell 2 through the switch S1 and is grounded through a switch S2. The output terminal of the amplifier 4-2 is connected to its own inverting input terminal. The gain of the amplifier 4-2 is one.

The output terminal of the amplifying circuit 4 is connected to an analog/digital (A/D) converter 6. The A/D converter 6 is, for example, of the dual slope type and supplies to a microcomputer 10 digital data NR corresponding to the differential voltage between an input voltage VIN from the amplifying circuit 4 and a reference voltage VR in response to an output pulse from a clock generator 8 for generating a clock pulse of a frequency $f_c$. A keyboard circuit 12 including various kinds of function keys (not shown) and a display 14 are coupled to the microcomputer 10.

Both ends of the driving power source E are coupled to two respective input terminals of a reference voltage generator 20 and a test voltage generator 22. The test voltage generator 22 is connected to the non-inverting input terminal of the amplifier 4-1 through a switch S3 and supplies to the amplifier 4-1 a false rated voltage VM which is set equal to a rated output voltage which is generated from the load cell 2 when a rated weight is applied to the load cell 2. The output voltage of the reference voltage generator 20 is supplied as a reference voltage VR to the A/D converter 6 and is also supplied to a zero-point setting circuit 24. The zero-point setting circuit 24 divides the output voltage from the reference voltage generator 20 and generates an output voltage VZ to set a reference operation point of the A/D converter 6.

Further, the load cell type weight-measuring device includes a switch control circuit 26 to control the switches S1 to S3 in accordance with the control data which is generated from the microcomputer 10.

FIG. 2 shows circuits of the reference voltage generator 20, test voltage generator 22, zero-point setting circuit 24, and A/D converter 6.

The reference voltage generator 20 includes buffer amplifiers 20-1 and 20-2 whose input terminals are respectively connected to positive and negative terminals of the driving power source E; and a differential amplifier 20-3 whose inverting and non-inverting input terminals are respectively connected to output terminals of the buffer amplifiers 20-1 and 20-2 through resistors R3 and R4. An output terminal of the differential amplifier 20-3 is connected to its own inverting input terminal through a resistor R5, while the non-inverting input terminal is grounded through a resistor R6. Further, the output terminal of the differential amplifier 20-3 is connected to a voltage divider which is constituted by a variable resistor R7 and a resistor R8. The variable resistor R7 is adjusted so that the output of this voltage divider can be set equal to the reference voltage VR. On the other hand, the test voltage generator 22 is constituted by buffer amplifiers 22-1 and 22-2; a differential amplifier 22-3 and resistors R9 to R14 which are connected in a similar manner as the buffer amplifiers 20-1 and 20-2; differential amplifier 20-3; and resistors R3 to R8 of the reference voltage generator 20. The variable resistor R13 is adjusted so that the voltage at the junction between the variable resistor R13 and the resistor R14 can be set equal to the rated output voltage of the load cell 2.

The zero-point setting circuit 24 includes a buffer amplifier 24-1 whose input terminal is connected to the junction between the variable resistor R7 and the resistor R8 of the reference voltage generator 20; and a variable resistor R15 and a resistor R16 which are connected in series between an output terminal of the buffer amplifier 24-1 and the ground. The junction between the variable resistor R15 and the resistor R16 is connected to the non-inverting input terminal of the amplifier 4-2.

In FIG. 2, the resistors R3, R5, R9, and R11 are formed so as to have the same resistance values as those of the resistors R4, R6, R10, and R12, respectively.

The A/D converter 6 includes a switch 6-1 which receives the output voltage VR from the reference voltage generator 20 through an inverting amplifier 6-2 and also receives the output voltage from the amplifier 4-2 in the amplifying circuit 4; an integrator 6-3 including a capacitor CI and a resistor RI; a ring counter 6-4 which counts clock pulses generated from the clock generator 8 and sets the switch 6-1 into a first switching position to allow the output signal from the amplifier 4-1 to be supplied to the integrator 6-3 in the case where the content of the count value lies within a range of "O" to "NS" or sets the switch 6-1 into a second switching position for allowing the output signal from the inverting amplifier 6-2 to be supplied to the integrator 6-3 in the case where the content lies within a range of "NS" to "NSX (>NS)"; counters 6-5 and 6-6 which count the clock pulses generated from the clock generator 8 and supply output data corresponding to the contents of the count values to the microcomputer 10; and a comparator 6-7 which generates an output signal when an output from the integrator 6-3 becomes 0, thereby stopping the operations of the counters 6-5 and 6-6. The output data from the counters 6-5 and 6-6 is supplied to the microcomputer 10 through gate circuits which are controlled by, for instance, an output signal from the comparator 6-7. The microcomputer 10 compares the output data which is supplied from the counters 6-5 and 6-6 through the individual data buses and processes them as normal data when they are coincident. In contrast, in the case where they are not coincident, the microprocessor 10 supplies to the display 14 the defective data indicating that the counters 6-5 and 6-6 and data buses are defective, thereby allowing the display 14 to display, for instance, "DEFECT".

The operation of the load cell type weightmeasuring device shown in FIGS. 1 and 2 will be described hereinbelow.

The output voltage VM of the test voltage generator 22 is given by the following equation.

$$VM = \frac{R11}{R9} \cdot \frac{R14}{R13 + R14} \cdot VE \quad (1)$$

The output voltage VR of the reference voltage generator 20 is given by the following equation.

$$VR = \frac{R5}{R3} \cdot \frac{R8}{R7 + R8} \cdot VE \quad (2)$$

The output voltage VZ of the zero-point setting circuit 24 is given by the following equation.

$$VZ = VR \cdot \frac{R16}{R15 + R16} \quad (3)$$

$$= \frac{R5}{R3} \cdot \frac{R8}{R7 + R8} \cdot \frac{R16}{R15 + R16} \cdot VE$$

The output voltage VL of the load cell 2 is given by the following equation.

$$VL = \frac{FX}{F_n} \cdot K \cdot VE + VLB \quad (4)$$

where, $F_n$ is a rated weight of the load cell 2; FX is a weight of a load which is applied to the load cell 2; K is a sensitivity of the load cell 2; and VLB is a zero-balance of the load cell 2.

The output voltage VO of the amplifying circuit 4 becomes either one of voltages VO1, VO2 and VO3 which is represented by the following equations depending upon the condition of the switches S1 to S3.

(a) In the case where only the switch S1 is in the ON-state, $$VO1 = \left(1 + \frac{R1}{R2}\right) \cdot VL - \frac{R1}{R2} \cdot VZ \quad (5)$$

(b) In the case where only the switch S2 is in the ON-state, $$VO2 = \left(1 + \frac{R1}{R2}\right) \cdot O - \frac{R1}{R2} \cdot VZ = -\frac{R1}{R2} \cdot VZ \quad (6)$$

(c) In the case where only the switch S3 is in the ON-state, $$VO3 = \left(1 + \frac{R1}{R2}\right) \cdot VM - \frac{R1}{R2} \cdot VZ \quad (7)$$

The output signal VI of the integrator 6-3 for integrating the signals VO and −VR which are supplied through the switch 6-1 is given by the following equation.

$$VI = \frac{-1}{CI \cdot RI} \int_{t1}^{t2} VO \, dt + \frac{-1}{CI \cdot RI} \int_{t2}^{t3} (-VR) \, dt \quad (8)$$

In equation (8), times t1 and t2 are preset. Assuming that the interval between times t1 and t2 is TS and the interval between times t2 and t3 is TR, the interval TR when VI=0 will then be obtained as follows.

$$\frac{-1}{CI \cdot RI} \cdot VO \cdot TS + \frac{1}{CI \cdot RI} \cdot VR \cdot TR = O \qquad (9)$$

Therefore, $$TR = \frac{VO}{VR} \cdot TS \qquad (10)$$

Since VR and TS are constant, TR is proportional to VO. By counting the clock pulses which are generated from the clock generator 8 in this interval VR, the count data $NR(=f_c \times TR)$ proportional to the output voltage VO from the amplifying circuit 4 is obtained. For example, when it is assumed that count data corresponding to the number of clock pulses which are generated from the clock generator 8 in the interval TS is $NS(=f_c \times TS)$, the data NR can be given by the following equation.

$$NR = \frac{VO}{VR} \cdot NS \qquad (11)$$

By substituting equations (2) and (5) for equation (11), the following equation is derived.

$$NR1 = \frac{\left(1 + \frac{R1}{R2}\right) \cdot VL - \frac{R1}{R2} \cdot VZ}{\frac{R5}{R3} \cdot \frac{R8}{R7+R8} \cdot VE} \cdot NS \qquad (12)$$

By substituting equations (3) and (4) for equation (12), the following equation is obtained.

$$NR1 = \frac{\left(1+\frac{R1}{R2}\right)\left(\frac{FX}{F_n} \cdot K \cdot VE + VLB\right)}{\frac{R5}{R3} \cdot \frac{R8}{R7+R8} \cdot VE} \cdot NS - \qquad (13)$$

$$\frac{\frac{R1}{R2} \cdot \frac{R5}{R3} \cdot \frac{R8}{R7+R8} \cdot \frac{R16}{R15+R16} \cdot VE}{\frac{R5}{R3} \cdot \frac{R8}{R7+R8} \cdot VE} \cdot NS$$

$$= \frac{\left(1+\frac{R1}{R2}\right)\left(\frac{FX}{F_n} \cdot K + \frac{VLB}{VE}\right)}{\frac{R5}{R3} \cdot \frac{R8}{R7+R8}} \cdot NS -$$

$$\frac{R1}{R2} \cdot \frac{R16}{R15+R16} \cdot NS$$

In equation (13), VLB/VE denotes an unbalance factor of the bridge constituting the load cell 2 and has a constant value. Therefore, NR1 in equation (13) is not affected due to a fluctuation in power supply voltage VE.

When it is now assumed that R1/R2=X1, R5/R3=X2, R8/(R7+R8)=Y1, R16/(R15+R16)=Y2, and VLB/VE=kB, equation (13) can be rewritten as follows.

$$NR1 = \frac{(1 + X1)\left(\frac{FX}{F_n} \cdot K + kB\right)}{X2 \cdot Y1} \cdot NS - X1 \cdot Y2 \cdot NS \qquad (14)$$

FIG. 3 shows the relationship between NR1 and FX expressed in equation (14).

In the case where the weight F(Z) of only the weighing tray and its supporting member is applied to the load cell 2, that is, a digital output data NR(Z) at a zero-point P is given by the following equation.

$$NR(Z) = \left\{ \frac{(1 + X1)\left(\frac{F(Z)}{F_n} \cdot K + kB\right)}{X2 \cdot Y1} - X1 \cdot Y2 \right\} \cdot NS \qquad (15)$$

When a rated weight F(F) is applied to the load cell type weight-measuring device, namely, when a weight F(Z+F) is applied to the load cell 2, the digital output data NR(Z+F) at a rated weight point Q of the device is given by the following equation.

$$NR(Z + F) = \qquad (16)$$

$$\left\{ \frac{(1 + X1)\left(\frac{F(Z+F)}{F_n} \cdot K + kB\right)}{X2 \cdot Y1} - X1 \cdot Y2 \right\} \cdot NS$$

A span SP of the weight-measuring device, that is, a weight measurement range is given by the following equation.

$$SP = NR(Z + F) - NR(Z) \qquad (17)$$

$$= \frac{(1 + X1)\left(\frac{F(F)}{F_n} \cdot K\right)}{X2 \cdot Y1} \cdot NS$$

Since Y1=R8/(R7+R8) in equation (17), by adjusting the variable resistor R7 of the reference voltage generator 20, the span SP can be adjusted.

Since the condition of $(FX/F_n) \cdot K + kB = 0$ is satisfied at the zero-point of the weight-measuring device, the digital output data NR(0) at the zero-point is given by the following equation.

$$NR(0) = -X1 \cdot Y2 \cdot NS \qquad (18)$$

Since Y2=R16/(R15+R16), the data NR(0) can be adjusted by adjusting the variable resistor R15 of the zero-point setting circuit 24.

In order to obtain the digital output data from the A/D converter 6 as the data which lies within the range determined by the positive and negative values, Y2 or resistor R15 may be adjusted in a manner such that NR(Z)<0 and NR(F+Z)>0, for instance, such that NR(F+Z)=−NR(Z). In the case of determining the zero-point in this way, when Y1 is changed to adjust the span SP, the zero-point variation ΔNR(Z) is given by the following equation since Y1 is not included in the term of (X1·Y2·NS) in the right side of equation (15) to determine the zero-point.

$$\Delta NR(Z) = \frac{(1 + X1)\left(\frac{F(Z)}{F_n} \cdot K + kB\right)}{X2 \cdot \Delta Y1} \cdot NS \qquad (19)$$

By adjusting the bridge balance of the load cell 2 so that $(F(Z)/F_n) \cdot K + kB = 0$ in equation (19), $\Delta NR(Z)$ can be set to 0. That is, in this case, even if Y1 is changed to adjust the span, NR(Z) will be hardly affected due to this change. Therefore, when Y1 is changed to adjust the span, the NR-FX characteristic straight line shown in FIG. 3 is set as the straight line which passes through the point P and has a slope corresponding to the variation amount of this Y1.

In the case where the output data from the A/D converter 6 is given as the data which lies within a range determined by the positive and negative values as mentioned above, the span of the weight-measuring device can be easily adjusted in accordance with the range of output data from the A/D converter 6.

The following equation is obtained by substituting equations (2) and (7) for equation (11).

$$NR3 = \frac{\left(1 + \frac{R1}{R2}\right) \cdot VL - \frac{R1}{R2} \cdot VZ}{\frac{R5}{R3} \cdot \frac{R8}{R7+R8} \cdot VE} \cdot NS \quad (20)$$

The following equation is derived by substituting equation (1) for equation (20).

$$NR3 = \frac{\left(1 + \frac{R1}{R2}\right) \cdot \frac{R11}{R9} \cdot \frac{R14}{R13+R14} \cdot VE}{\frac{R5}{R3} \cdot \frac{R8}{R7+R8} \cdot VE} \cdot NS - \frac{\frac{R1}{R2} \cdot \frac{R5}{R3} \cdot \frac{R8}{R7+R8} \cdot \frac{R16}{R15+R16} \cdot VE}{\frac{R5}{R3} \cdot \frac{R8}{R7+R8} \cdot VE} \cdot NS \quad (21)$$

$$= \frac{(1+X1) \cdot X3 \cdot Y3}{X2 \cdot Y1} \cdot NS - X1 \cdot Y2 \cdot NS$$

where, $R11/R9 = X3$ and $R14/(R13+R14) = Y3$.

As is obvious from equation (21), since NR3 is independent of the power supply voltage VE, it is not affected due to fluctuation in the power supply voltage.

In addition, since $[-X1 \cdot Y2 \cdot NS]$ in equation (21) indicates the digital output data at the zero-point, in order to adjust the operating point of the amplifying circuit 4, Y3 may be adjusted so that $$\left[\frac{(1+X1) \cdot X3 \cdot Y3}{X2 \cdot Y1} \cdot NS\right]$$

in equation (21) and may be made equal to $$\left[\frac{(1+X1) \cdot \left(\frac{F(F)}{F_n} \cdot K\right)}{X2 \cdot Y1} \cdot NS\right]$$

in equation (17), namely, so that Y3 satisfies the following equation.

$$X3 \cdot Y3 = \frac{F(F)}{F_n} \cdot K \quad (22)$$

Therefore, $$Y3 = \frac{1}{X3} \cdot \frac{F(F)}{F_n} \cdot K \quad (23)$$

Then, the following equation is obtained by substituting equations (2) and (6) for equation (11).

$$NR2 = \frac{-\frac{R1}{R2} \cdot VZ}{\frac{R5}{R3} \cdot \frac{R8}{R7+R8} \cdot VE} \cdot NS \quad (24)$$

$$= \frac{-Y3 \cdot X2 \cdot Y1 \cdot Y2}{X2 \cdot Y1} \cdot NS$$

$$= -Y3 \cdot Y2 \cdot NS$$

NR2 which is given by this equation (24) is equal to NR(Z) which is given in equation (15) when $(F(Z)/F_n) \cdot K + kB = 0$. Namely, if the bridge balance of the load cell 2 is preadjusted so that $(F(Z)/F_n) \cdot K + kB = 0$ in the load cell 2, NR2 is made equal to NR(Z). For this purpose, the correcting resistor RZ is used.

In the weight-measuring mode, the switch S1 is set to the ON-state and the output signal from the load cell 2 is supplied to the amplifying circuit 4. This signal is then converted to the digital data by the A/D converter 6 in the ordinary well-known manner. Thereafter, this digital data is sent to the microcomputer 10, so that the corresponding weight data is displayed on the display 14.

In the case of executing the function check of the amplifying circuit 4, a check is made to see if the span SP represented by equation (17) is set to a predetermined value or not. That is, the switch S2 is turned on and NR2 which is given by equation (24) is supplied to the microcomputer 10. Next, the switch S3 is turned on to allow NR3 which is represented by equation (21) to be supplied to the microcomputer 10. The microcomputer 10 temporarily stores the supplied data NR2 and NR3 in the memory provided therein and obtains the span SP in accordance with the following equation.

$$SP = NR3 - NR2 \quad (25)$$

A check is made to see if the span SP derived by calculating this equation (25) lies within a predetermined range or not. When it is detected that the span SP is out of the predetermined range, the microcomputer 10 permits the display 14 to display, for instance, "NO GOOD." It is possible to allow the microcomputer 10 to execute periodically and automatically such weight-measuring and functionchecking operations by sequentially turning on the switches S1, S2 and S3.

Although the present invention has been described in the above with respect to one embodiment, the invention is not limited to only this embodiment. For example, it is also possible to omit one of the counters 6-5 and 6-6 and thereby to omit the checking function to see if the output data from the A/D converter 6 is normal or not.

What is claimed is:

1. A load cell type weight-measuring device comprising:
   a load cell which generates an output voltage responsive to a weight which is applied thereto;
   test voltage generating means for generating an output voltage equal to an output voltage which is generated from said load cell when a rated weight is applied thereto;

zero-point setting means;

first amplifying means of a gain 1 for amplifying an output voltage from said zero-point setting means;

first and second resistor means;

second amplifying means having first and second input terminals, said first input terminal being connected to an output terminal of said first amplifying means through said first resistor means and also connected to an output terminal thereof through said second resistor means;

switching means for selectively coupling one of output terminals of said load cell and test voltage generating means to said second input terminal of said second amplifying means;

analog-digital converting means for converting an output voltage from said second amplifying means to digital data; and data processing means for processing output data from said analog-digital converting means and generating weight data.

2. A device according to claim 1, wherein said switching means comprises a switch connected between a reference potential terminal and the second input terminal of said second amplifying means.

3. A device according to claim 1, in which said analog-digital converting means comprises a dual slope type analog-digital converter, and which further comprises a reference voltage generator for supplying a reference voltage to said analog-digital converter and to said zero-point setting means.

4. A device according to claim 3, wherein said analog-digital converter comprises: an integrator which integrates the output signal from said second amplifying means for a predetermined interval and thereafter integrates the output signal from said zero-point setting means until the integrated output reaches a predetermined value; and first and second counters for counting the interval when said integrator is integrating the output signal from the zero-point setting means, and said data processing circuit generating said weight data only when both output data from said first and second counters coincide.

5. A device according to claim 3, wherein said switching means comprises a switch connected between a reference potential terminal and the second input terminal of said second amplifying means.

6. A device according to claim 1, wherein said load cell comprises a bridge circuit having four strain gauge resistors and a correcting resistor which is connected in series with one of the four strain gauge resistors.

7. A device according to claim 6, wherein said switching means comprises a switch connected between a reference potential terminal and the second input terminal of said amplifying means.

8. A device according to claim 6, in which said analog-digital converting means comprises a dual slope type analog-digital converter, and which further comprises a reference voltage generator for supplying a reference voltage to said analog-digital converter and to said zero-point setting means.

9. A device according to claim 8, wherein said switching means comprises a switch connected between a reference potential terminal and the second input terminal of said second amplifying means.

10. A device according to claim 8, wherein said analog-digital converter comprises: an integrator which integrates the output signal from said second amplifying means for a predetermined interval and thereafter integrates the output signal from said zero-point setting means until the integrated output reaches a predetermined value; and first and second counters for counting the interval when said integrator integrates the output signal from the zero-point setting means, and said data processing circuit generating said weight data only when both output data from said first and second counters coincide.

11. A device according to claim 10, wherein said switching means comprises a switch connected between a reference potential terminal and the second input terminal of said second amplifying means.

* * * * *